US009301146B2

United States Patent
Karaoguz et al.

(10) Patent No.: US 9,301,146 B2
(45) Date of Patent: Mar. 29, 2016

(54) MULTIPLE NETWORK, SHARED ACCESS SECURITY ARCHITECTURE SUPPORTING SIMULTANEOUS USE OF SINGLE SIM MULTI-RADIO DEVICE AND/OR PHONE

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 145 days.

(21) Appl. No.: 14/150,490

(22) Filed: Jan. 8, 2014

(65) Prior Publication Data
US 2014/0120880 A1    May 1, 2014

Related U.S. Application Data

(63) Continuation of application No. 12/365,015, filed on Feb. 3, 2009.

(51) Int. Cl.
*H04M 1/66* (2006.01)
*H04W 12/08* (2009.01)
*H04L 29/06* (2006.01)
*H04M 15/00* (2006.01)
*H04M 17/00* (2006.01)
*H04M 17/02* (2006.01)
*H04W 4/24* (2009.01)
(Continued)

(52) U.S. Cl.
CPC ........... *H04W 12/08* (2013.01); *H04L 63/0815* (2013.01); *H04M 15/7556* (2013.01); *H04M 15/765* (2013.01); *H04M 15/77* (2013.01); *H04M 15/774* (2013.01); *H04M 17/00* (2013.01); *H04M 17/02* (2013.01); *H04W 4/24* (2013.01); *H04W 12/06* (2013.01); *H04M 2215/724* (2013.01); *H04M 2215/7231* (2013.01); *H04M 2215/7254* (2013.01); *H04M 2215/7272* (2013.01); *H04W 60/005* (2013.01); *H04W 76/025* (2013.01)

(58) Field of Classification Search
CPC ....... H04W 12/08; H04W 4/24; H04W 12/06; H04W 60/005; H04W 76/025; H04L 63/0815; H04M 15/7556; H04M 15/765; H04M 15/77; H04M 15/774; H04M 17/00; H04M 17/02; H04M 2215/7231; H04M 2215/724; H04M 2215/7254; H04M 2215/7272
See application file for complete search history.

(56) References Cited

U.S. PATENT DOCUMENTS 6,876,747 B1    4/2005    Faccin et al.
7,403,621 B2    7/2008    Vial en et al.
(Continued)

*Primary Examiner* — Keith Fang
(74) *Attorney, Agent, or Firm* — Brinks Gilson & Lione

(57) ABSTRACT

A method and system is presented for a mobile wireless communication device that may communicate information to a first network device for enabling authentication, authorization and/or management of accounting for the mobile wireless device for use within a first network that utilizes a first wireless communication standard. A communication session may be established with a second network that utilizes a second wireless standard based on data sent to the second network related to the first authentication, authorization and/or accounting management. The wireless mobile device is operable to establish simultaneous communication sessions with the first network and the second network without communicating authentication, authorization and/or accounting information to the second network. The first and/or second network may comprise and/or share a session control server. The mobile wireless device may receive, store and/or modify additional information associated with the authentication, authorization and/or accounting management.

19 Claims, 7 Drawing Sheets

(51) Int. Cl.
*H04W 12/06* (2009.01)
*H04W 60/00* (2009.01)
*H04W 76/02* (2009.01)

(56) References Cited

U.S. PATENT DOCUMENTS

| | | |
|---|---|---|
| 2004/0066769 A1 | 4/2004 | Ahmavaara et al. |
| 2006/0211447 A1 | 9/2006 | Purkayastha et al. |
| 2008/0026724 A1 | 1/2008 | Zhang |
| 2008/0160959 A1 | 7/2008 | Huang et al. |
| 2008/0248800 A1 | 10/2008 | Jalloul |
| 2009/0104892 A1* | 4/2009 | Jones et al. ............... 455/412.1 |
| 2009/0124236 A1 | 5/2009 | Cho |
| 2009/0219899 A1 | 9/2009 | Dostal et al. |
| 2009/0285176 A1 | 11/2009 | Zheng et al. |
| 2010/0091733 A1* | 4/2010 | Hahn et al. .................... 370/331 |
| 2010/0099454 A1* | 4/2010 | Reddy ....................... 455/552.1 |

\* cited by examiner

MULTIPLE NETWORK, SHARED ACCESS SECURITY ARCHITECTURE SUPPORTING SIMULTANEOUS USE OF SINGLE SIM MULTI-RADIO DEVICE AND/OR PHONE

CROSS REFERENCE TO RELATED APPLICATIONS

This application claims priority to U.S. patent application Ser. No. 12/365,015, filed Feb. 3, 2009, which is incorporated by reference in its entirety.

TECHNICAL FIELD

Certain embodiments of the invention relate to communication systems. More specifically, certain embodiments of the invention relate to a method and system for multiple network, shared access security architecture supporting simultaneous use of a single SIM multi-radio device and/or phone.

BACKGROUND

For many people, utilizing a plurality of wireless electronic devices has become a part of everyday life. Many wireless devices have evolved from a convenient method for voice communication to multi-functional resources that offer, for example, still and moving image features, media playback, electronic gaming, Internet browsing, and email. Cellular phones with built-in cameras, or camera phones, have become prevalent in the mobile phone market, due to the low cost of CMOS image sensors and the ever increasing customer demand for more advanced cellular phones. Increasingly, multi-mode wireless device that comprise a plurality of radio interfaces enable communication via a variety of wireless network technologies.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for multiple network, shared access security architecture supporting simultaneous use of a single SIM multi-radio device and/or phone, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Figure 1A:
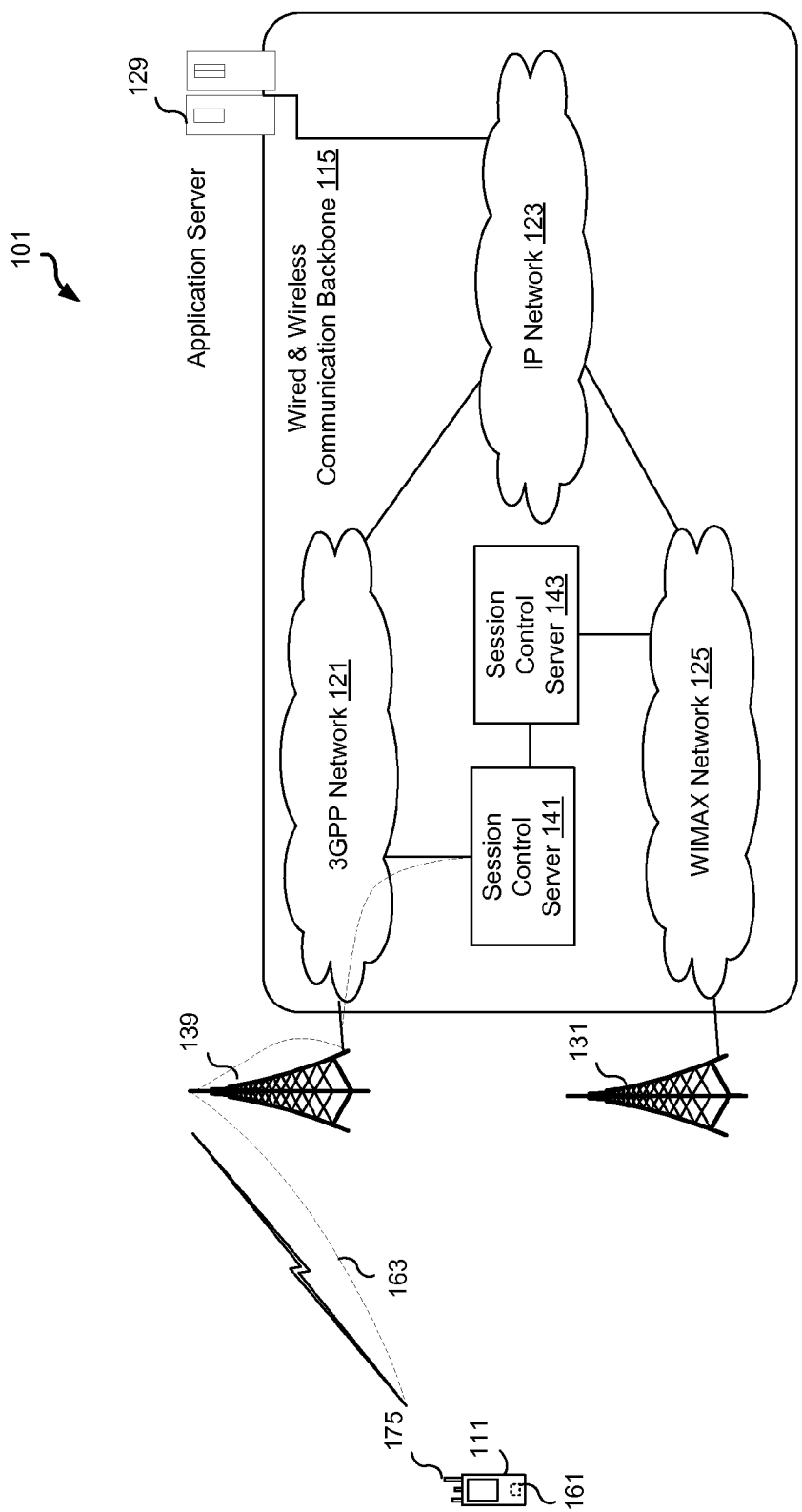
FIG. 1A is a block diagram illustrating exemplary networks that are operable to share authentication, authorization and/or accounting information for simultaneous sessions, in accordance with an embodiment of the invention.

Aspects of the invention may be found in a method and system for multiple network, shared access security architecture supporting simultaneous use of a single SIM multi-radio device and/or phone. A mobile wireless communication device may communicate information to a first network device in a first wireless network that utilizes a first wireless communication standard. In this regard, the first network device may authenticate, authorize and/or manage accounting for the mobile device for use within the first network. When the mobile wireless communication device is located within a service area of a second wireless network that utilizes a second wireless communication standard, a communication session may be established with the second network based on the authentication, authorization and/or accounting management for the first network device. In this regard, the first network device may communicate data related to the authentication, authorization and/or accounting management to the second network device in the second network to enable the communication session with the mobile wireless communication device. In various embodiments of the invention, the mobile communication device communicates the authentication, authorization and/or accounting information to the first network device in the first wireless network that utilizes the first wireless communication standard via the second wireless network that utilizes the second wireless communication standard. The mobile communication device may establish the communication session with the second network that utilizes the second wireless communication standard without transferring the authentication, authorization and/or accounting management information to the second network device. Furthermore, the mobile communication device may establish simultaneous communication sessions with the first network utilizing the first wireless communication standard and the second network utilizing the second wireless communication standard based on the data communicated from the first network device related to the authentication, authorization and/or accounting management. The first network device, the second network device and/or another network device that enables the authentication, the authorization and/or the accounting management may comprise a session control server. The session control server may be shared by the first network and the second network. In various embodiments of the invention, the mobile wireless communication device may communicate authentication, authorization (AAA) and/or accounting information to the first network via an extension of the first network that comprises a portion of the second network which utilizes the second wireless communication standard. Gaining access to the second network for a session and/or call may be based on the communicated AAA information. In various embodiments of the invention, the mobile wireless communication device may receive, store and/or modify additional information associated with the authentication, authorization and/or accounting management from the second network device.

FIG. 1A is a block diagram illustrating exemplary networks that are operable to share authentication, authorization and/or accounting information for simultaneous sessions, in accordance with an embodiment of the invention. Referring to FIG. 1A, there is shown a communication system 101 comprising a communication backbone 115, a 3GPP network 121, a WIMAX network 125, an IP network 123, a multimode wireless device 111, one or more antennas 175, a subscriber identity module (SIM) 161, a 3GPP base station 139, a WIMAX base station 131, session control servers 141 and 143, an application server 129 and a communication path 163.

The multimode wireless device 111 comprises suitable logic circuitry and/or code to communicate voice and/or data via one or more wireless technologies to one or more access points and/or base stations 131 and/or 139. The multimode wireless device 111 comprises one or more antennas 175 that are operable to support multi-mode transmissions. Any suitable antenna technology, for example, smart antennas may be utilized for the one or more antennas 175. In addition, the multimode wireless device comprises the subscriber identity module (SIM) 161. The SIM 161 is a removable IC circuit card that stores subscriber's security credentials, for example, a subscriber security key. Although the multi-mode wireless device 111 shown in FIG. 1A comprises the SIM 161, the invention is not limited in this regard and may embody any suitable subscriber card such as a universal integrated circuit card (UICC) and/or a removable user identity module (RUIM). Alternatively, the device may comprise an integrated security module. In addition, the invention is not limited with regard to any specific type of wireless technology. For example, the multimode wireless device 111 is operable to communicate via one or more of 3GPP, 3GPP2, LTE, WIMAX, WiFi, WLAN, Bluetooth as well as cordless phone standards such as DECT and/or PHS.

In various embodiments of invention, the multi-mode wireless device is operable to support multiple sessions with multiple networks that may be operated by the same service provider or by different service providers, for example, the 3GPP network 121 and the WIMAX network 125. In this regard, the 3GPP network 121 and WIMAX network 125 may support different wireless technologies. The multimode wireless device 111 is operable to gain access to the WIMAX network 125 based on an authentication, authorization and/or accounting (AAA) voucher from the 3GPP network 121. For example, the multimode wireless device 111 is operable to conduct AAA transactions with the 3GPP network 121 and subsequently access the WIMAX network 125 based on an assurance and/or a voucher from the 3GPP network 121. The assurance and/or voucher are communicated from the 3GPP network 125 to the WIMAX network 121 indicating that the multimode wireless device 111 is authenticated. The assurance and/or voucher additionally comprise other information derived from the AAA transaction, for example, authorization and/or accounting information. The multimode wireless communication device 111 is shown as a portable phone within the FIG. 1A however, the invention is not so limited and comprises any suitable multimode wireless device. Exemplary embodiments of the multimode wireless communication device 111 are a laptop, a cabled or wireless headset, a media player, a game device and/or a geo-location device.

The communication backbone 115 comprises suitable logic circuitry and/or code to enable wired and/or wireless communication between a plurality of networks and/or sub-networks owned and/or operated by one or more service providers. A service provider, which is also referred to as a network operator and just an operator represents an entity that owns, leases and/or operates the one or more communication networks. Notwithstanding, the communication backbone 115 comprises a plurality of communicatively coupled wired and/or wireless networks that are operated by one or more service providers. The communication backbone is communicatively coupled to at least the 3GPP network 121, the WIMAX network 125, the IP network 123, a plurality of base stations and/or access points (AP), for example, the 3GPP base station 139, the WIMAX base station 131 the application server 129 and one or more session control servers (SCS) 141 and/or 143. In various embodiments of the invention, the communication backbone 115 enables communication of authentication, authorization and/or accounting (AAA) vouchers between the plurality of networks 121 and 125 and the session control servers 141 and/or 143. In this regard, the AAA vouching comprises giving assurance that a successful AAA transaction has been conducted between a network and a multi-mode wireless device and additionally comprises providing information regarding the AAA transaction.

The 3GPP network 121 comprises suitable logic, circuitry and/or code that are operable to communicate based on one or more wireless communication standards with the multimode wireless device 111. The 3GPP network 121 is communicatively coupled to the WIMAX network 125 and with the IP network 123. In addition, the 3GPP network 121 comprises and/or is coupled to a session control server 141. The 3GPP network 121 comprises a single network or comprises a heterogeneous plurality of wired and/or wireless networks.

Although a 3GPP network is shown, the invention is not limited in this regard. For example, any wireless technology that is operable to authenticate a wireless device and/or a subscriber or operable to receive an authentication, authorization and/or accounting voucher may be utilized. Exemplary suitable wireless technologies comprise 3GPP2, WCDMA, WIMAX, WiFi, WLAN and/or DECT.

The 3GPP network 121 is operable to enable communication sessions and/or calls with the multi-mode wireless device 111 while the multi-mode wireless device 111 is engaged in one or more simultaneous sessions and/or calls with another network, for example, the WIMAX network 125. Moreover, the 3GPP network 121 and the WIMAX network 125 are operable to handle handing off the multimode wireless device 111 between them. The simultaneous sessions and/or a handoffs between networks 121 and 125, are enabled by an authentication, authorization and/or accounting (AAA) voucher. In this regard, upon receiving a request for a handoff or for a simultaneous session and/or call, a serving network requests an AAA voucher from a session control server 141. The AAA vouchering comprises providing assurance from the control server 141 that a prior successful AAA transaction has been conducted between the 3GPP network and/or control server 141 and the multi-mode wireless device 111 and additionally comprises providing information regarding the AAA transaction.

The WIMAX network 125 comprises suitable logic, circuitry and/or code that are operable to establish a session and/or call with the multi-mode wireless device 111 and communicate data based on the 802.16 communication standard and/or variants thereof. The WIMAX network 125 is communicatively coupled to the 3GPP network 121, the IP network 123 and one or more base stations, for example, the WIMAX base station 131. In addition, the WIMAX network 125 comprises and/or is coupled to a session control server 141. The WIMAX network 125 and the 3GPP network 121 may be owned by different service providers and/or a single service provider. Although a WIMAX network 125 is shown, the invention is not limited to any specific type of wireless technology and the WIMAX and/or 3GPP networks could be combined, swapped or replaced with other technologies, for example, WiFi, 3GPP2, WiFi, WLAN and/or DECT technology. Moreover, any suitable wireless technology network may be utilized to handle one or more calls or sessions based on AAA vouchers.

The IP network 121 comprises suitable logic, circuitry and/or code that are operable to communicate packet data across an internetwork, for example, the IP network 121 may be the Internet. The IP network 123 is communicatively coupled to the 3GPP network 121, the WIMAX operator's network 125 and the application server 129.

The 3GPP base station 139 comprises suitable logic, circuitry and/or code that are operable to support cellular communications between the multimode wireless device 111 and the 3GPP network 121. In addition, the 3GPP base station 139 comprises a network access server that handles authentication, authorization and/or accounting (AAA) transactions with the session control server (SCS) 141 for the multimode wireless device 111. The network access server within the 3GPP base station 139 handles access procedures between the multimode wireless device 111 and various entities within the communication system 101 such as the server 129 on the IP network 123. In various embodiments of the invention, the network access server within the 3GPP base station handles access procedures between the multimode wireless device 111 and a telephone (not shown) within a public switched telephone network (PSTN) that is connected to the 3GPP network 121.

In various embodiments of the invention, the 3GPP base station 139 supports simultaneous sessions and/or handoffs with other base stations and/or access points (AP) that are part of a different network, for example, the WIMAX base station 131 in the WIMAX network 125. In this regard, the 3GPP base station 139 is operable handle simultaneous sessions and/or handoffs for the multimode wireless device 111 based on AAA vouchers that are received from the SCS 141. In various embodiments of the invention, the 3GPP base station 139 is located in a building or outdoors. Notwithstanding, the 3GPP base station 139 comprises one or more antennas that are mounted at any appropriate height on or near the base station 139. Any suitable antennas are utilized, for example, omni or directional antennas, panel antennas, whip antennas, antenna arrays, smart antennas and/or any suitable SISO, SIMO, MISO, and MIMO system. Moreover, a plurality of base stations and/or APs may share the antennas and/or support structure with the 3GPP base station 139. In various embodiments of the invention, for example, in 802.11 networks, the base station is replaced with an access point.

The WIMAX base station 131 comprises suitable logic, circuitry and/or code that are operable to support cellular communications between the multimode wireless device 111 and the WIMAX network 125. In many respects, the WIMAX base station 131 is similar to the 3GPP base station 139. In this regard, the WIMAX base station 131 comprises a network access server that is operable to handle authentication, authorization and/or accounting (AAA) transactions with the session control server (SCS) 141 for the multimode wireless device 111.

The network access server within the WIMAX base station 131 handles access procedures between the multimode wireless device 111 and various entities within the communication system 101 such as the application server 129 on the IP network 123 and/or, for example, a telephone (not shown) within a public switched telephone network (PSTN) that is connected to the 3GPP network 121. In various embodiments of the invention, the WIMAX base station 131 supports simultaneous sessions and/or handoffs with other base stations and/or access points (AP) that are part of a different network, for example, the 3GPP base station 131 in the 3GPP network 121. In this regard, the WIMAX base station 131 is operable to handle simultaneous sessions and/or handoffs for the multimode wireless device 111 based on AAA vouchers from the SCS 141. The WIMAX base station 131 is located indoors or outdoors. Additionally, the WIMAX base station 131 comprises one or more antennas that are mounted at any appropriate height on or near the WIMAX base station 131. Any suitable antennas are utilized, for example, omni or directional antennas, panel antennas, whip antennas, antenna arrays, smart antennas and/or any suitable SISO, SIMO, MISO, MIMO system. Moreover, a plurality of base stations and/or APs may share antennas and/or are co-located with the WIMAX base station 131. In various embodiments of the invention, for example, in 802.11 networks, the base station is replaced with an access point.

The session control servers (SCS) 141 and 143 comprise suitable logic circuitry and/or code that are operable to handle authentication, authorization and/or accounting transactions for the multimode wireless device 111. In this regard, the SCS 141 and SCS 143 are operable to authenticate and/or approve access to the 3GPP network 121 and the WIMAX network 125 respectively. The SCS 141 and SCS 143 are operable to authenticate the multimode wireless device 111 upon receiving a digital identity and/or security credentials for the device and/or a user of the device. For example, security credentials comprise a subscriber service ID from the SIM 161, a password, token, digital certificate and/or phone number. In addition, the SCS 141 and SCS 143 are operable to authorize various privileges and/or services for the multimode wireless device 111 based on applicable authentication results and restrictions.

The SCS 141 and SCS 143 are also operable to handle accounting for the multimode wireless device 111 by tracking resource usage that is utilized for billing and/or other purposes. Accounting methods according to the types of resources that are being consumed. For example, accounting procedures for continuous circuit switched voice calls are different than that for bursts of data transmissions. An exemplary session control server 141 and/or 143 communicates based on, for example, RADIUS protocol or Diameter protocol.

The SCS 141 and SCS 143 communicate with the network access server in the 3GPP base station 139 and the network access server in the WIMAX base station 131 respectively. The SCSs 141 and 143 are communicatively coupled in various configurations with various networks. For example, one or more SCSs are configured to manage AAA transactions for a single network. For example, the SCS 141 manages AAA transactions for the 3GPP network 121 and the SCS 143 manages AAA transactions for the WIMAX network 125. In this regard, the SCS 141 is communicatively coupled to the SCS 143. In other embodiments of the invention, the 3GPP network 121 shares an SCS with the WIMAX network 125. In various embodiments of the invention, the SCS 141 and/or 143 are operable to authorize access to a network based on authentication, authorization and/or accounting transactions that were performed for a prior access attempt to another network. For example, when the multimode wireless device 111 is handed off between the 3GPP network 121 and the WIMAX network 125, or has simultaneous sessions on the different networks, the SCS 141 and/or SCS 143 are operable to vouch for the credibility of the device 111 to the network that is second or more to be accessed. In this regard, the wireless multimode device 111 gains access to a subsequent network connection, for example, a WIMAX network 125 connection without having to re-authenticate, re-authorize and/or re-initiate accounting. In various embodiments of the invention, the SCS 141 and/or SCS 143 handles authorization and/or accounting for the multimode wireless device 111 subsequent to the vouching.

The application server 129 comprises suitable logic, circuitry and/or code that are operable to communicate and/or download data to the multimode wireless device 111 via a plurality of paths. For example, the application server 129 sends data to the wireless multimode device 111 via the IP network 123, the 3GPP network 121 and the 3GPP base station 139. Alternatively, the application server 129 sends data via the IP network 123, the WIMAX network 125 and the WIMAX base station 131. The application server 129 comprises any suitable IP network or Internet server, for example, a video server.

The communication path 163 is an exemplary illustration of a communication path through a plurality of network elements that handle a call and/or a session between the multimode wireless device 111 and a networked resource. In this regard, the communication path 163 is an exemplary illustration of a communication path through a plurality of network elements that handle authentication, authorization and/or accounting (AAA) transactions and/or AAA vouching. In this regard, the communication path 163 traverses a path between the multimode wireless device 111, the base station 139, the 3GPP network 121 and the session control server (SCS) 141.

Figure 1B:
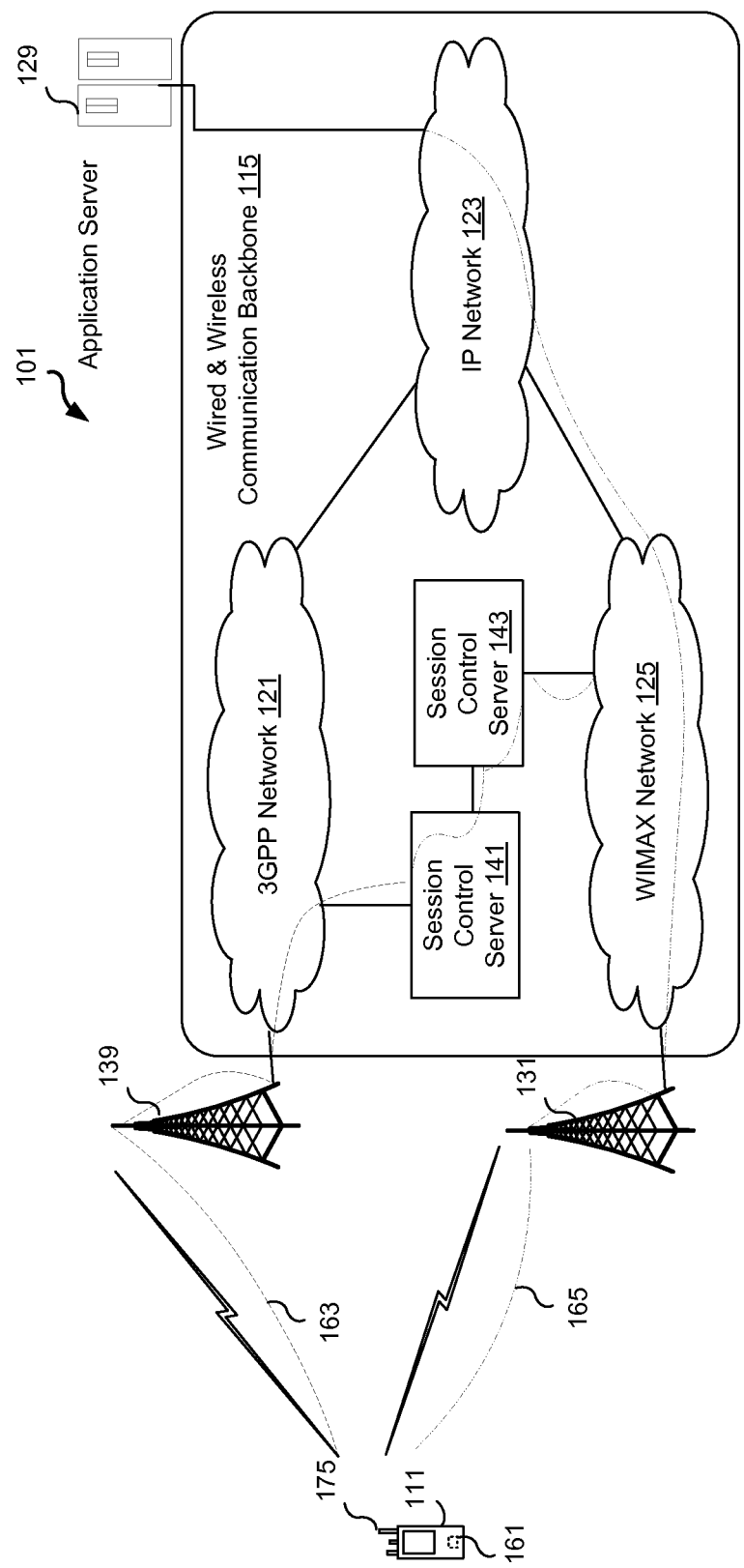
FIG. 1B is a block diagram illustrating exemplary simultaneous sessions between multiple networks based on an authentication, authorization and/or accounting voucher, in accordance with an embodiment of the invention.

FIG. 1B is a block diagram illustrating exemplary simultaneous sessions between multiple networks based on an authentication, authorization and/or accounting voucher, in accordance with an embodiment of the invention. Referring to FIG. 1B, there is shown, a communication system 101 comprising a 3GPP network 121, a WIMAX network 125, an IP network 123, a multimode wireless device 111, one or more antennas 175, a subscriber identity module (SIM) 161, a 3GPP base station 139, a WIMAX base station 131, session control servers 141 and 143, an application server 129, a communication path 163 and a communication path 165.

The network elements in FIG. 1B are the same as those in FIG. 1A; however, FIG. 1B comprises a communication path 165 that illustrates a path between the multimode wireless device 111 and the application server 129. In this regard, the communication path 165 traverses a path comprising the multimode wireless device 111, the WIMAX base station 131, the WIMAX network 125, the IP network 123 and the application server 129. In addition, the communication path 163 that is dedicated to AAA communications remains intact and is extended to the SCS 143 and/or WIMAX network 125 to handle AAA vouchering and for, example, billing activity. Accordingly, the communication path 165 traverses a path comprising the multimode wireless device 111, the 3GPP network 121, the SCS 141, the SCS 143 and the WIMAX network 125.

In operation, referring to FIG. 1A, the multimode wireless device (MWD) 111 registers with the 3GPP base station 131 and the 3GPP network 121. The wireless multimode device 111 engages in authentication, authorization and/or accounting transactions with the SCS 141 via the 3GPP base station 131, the 3GPP network and/or other networks such as the IP network 123. Accordingly, the MWD 111 sends the 3GPP base station 139 a request for a connection. A network access server in the base station sends an access request to the session control server (SCS) 141 via the 3GPP network 121. In this regard, the network access server utilizes RADIUS protocol when sending the access request. The SCS 141 sends a SIM challenge to the 3GPP base station 139 via the 3GPP network 121 and the 3GPP base station 139 sends the SIM challenge to the MWD 111. The SIM challenge comprises a sequence of numbers for example. The MWD 111 processes the SIM challenge, for example, it generates a SIM challenge response utilizing its subscriber security key from the SIM 161 and a hashing function for example. The MWD 111 sends the SIM challenge response to the 3GPP base station 139 and the base station sends the response to the SCS 141 via the 3GPP network 121.

In instances when the SIM challenge response is successful, the SCS 141 grants access and/or authorize various permissions to the MWD 111 for one or more networks. Also, the SCS 141 begins accounting procedures for the MWD 111. Subsequently, the MWD 111 determines that a data session or call will be requested to the application server 129, for example, in order to receive a video stream. In various embodiments of the invention, the MWD 111 foregoes AAA transactions with the WIMAX network because the SCS 141 is operable to vouch for the credibility of the MWD 111 based on the AAA transactions that were conducted via the 3GPP network 121. The MWD 111 sends a request to the 3GPP base station for an AAA voucher to access the WIMAX base station 131. The 3GPP base station 131 sends the voucher request to the SCS 141 via the path 163.

Referring to FIG. 1B, the MWD 111 initiates a data session with the WIMAX base station 131. The SCS 141 sends an AAA voucher to WIMAX network 125 via the SCS 143 and/or the IP network 123. The WIMAX network 125 sends a request to start accounting for the requested session or call to the SCS 143 and/or the SCS 141. The SCS 141 and/or the SCS 143 returns an accounting start confirmation to the WIMAX base station 131 via the WIMAX network 125. The WIMAX base station 131 sends a session or call granted message to the MWD 111 and the WIMAX network 125 sets up the data communication path 165 between MWD 111, the WIMAX base station 131, the WIMAX network 125, the IP network 123 and the application server 129. The application server begins streaming video to the MWD 111. During the video streaming the SCS 143 and/or the SCS 141 tracks resource usage along the path 165 for billing purposes.

In various embodiments of the invention, the path 163 maintains a connection between the MWD 111, the 3GPP base station 139, the 3GPP network 121, the SCS 141, the SCS 143 and the WIMAX network 125 simultaneously with the video streaming session via the path 165. In this regard, the path 163 between the MWD 111 and the SCS 141 remains intact after the video streaming session between the MDW 111 and the application server 111 begins. In other embodiments of the invention, the MWD 111 releases portions of the path 163 when they are no longer requested or needed. In this regard, after the AAA voucher confirmation is sent from the SCS 141 to the WIMAX base station 131, the SCS 141 and/or the SCS 143 handles further accounting for the video streaming session via the WIMAX network 125.

Figure 2A:
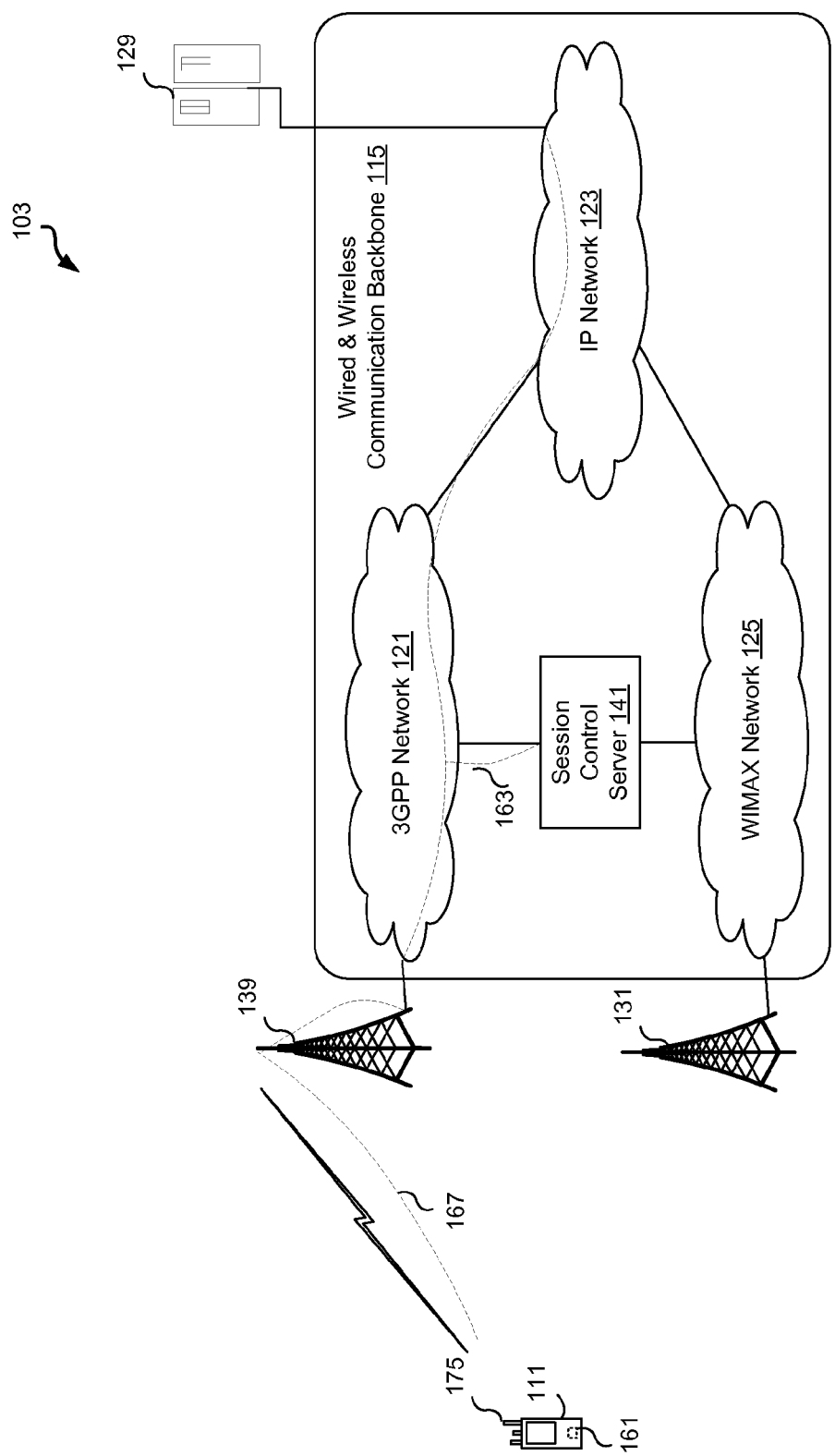
FIG. 2A is a block diagram illustrating two exemplary wireless networks that share a session control server that is operable to support AAA vouchers, in accordance with an embodiment of the invention.

FIG. 2A is a block diagram illustrating two exemplary wireless networks that share a session control server that is operable to support AAA vouchers, in accordance with an embodiment of the invention. Referring to FIG. 2A, there is shown a communication system 103 comprising a 3GPP network 121, a WIMAX network 125, an IP network 123, a multimode wireless device 111, one or more antennas 175, a subscriber identity module (SIM) 161, a 3GPP base station 139, a WIMAX base station 131, a session control server 14, an application server 129 and a communication path 167.

The numbered network elements shown in the communication system 103 are similar or substantially the same as the respective numbered elements shown in the communication system 101 of FIGS. 1A and 1B. A difference between the communication system 101 and communication system 103 is that in the communication system 103 shown in FIGS. 2A and 2B comprises a session control server (SCS) 141 that is shared between at least the 3GPP network 121 and the WIMAX network 125. In various embodiments of the invention, the 3GPP network 121 and the WIMAX network 125 are owned and/or operated by the same service provider. In other embodiments of the invention, the 3GPP network 121 and the WIMAX network 125 are owned and/or operated by the same service provider. Moreover, in various exemplary embodiments of the invention, the SCS 141 is owned and/or operated by a third party. Notwithstanding, the invention is not so limited and is operated by other entities.

The communication path 167 represents a communication path through a plurality of network elements that handle a call and/or a session between the multimode wireless device 111 and a networked resource, for example, the application server 129. In this regard, the communication path 167 traverses a path comprising the multimode wireless device 111, the 3GPP base station 139 the 3GPP network 121, the IP network 123 and the application server 129. In addition, the communication path 163 is an exemplary illustration of a communication path through a plurality of network elements that handle authentication, authorization and/or accounting (AAA) transactions and/or AAA vouching. In this regard, the communication path 163 traverses a path between the multimode wireless device 111, the base station 139, the 3GPP network 121 and the session control server (SCS) 141.

Figure 2B:
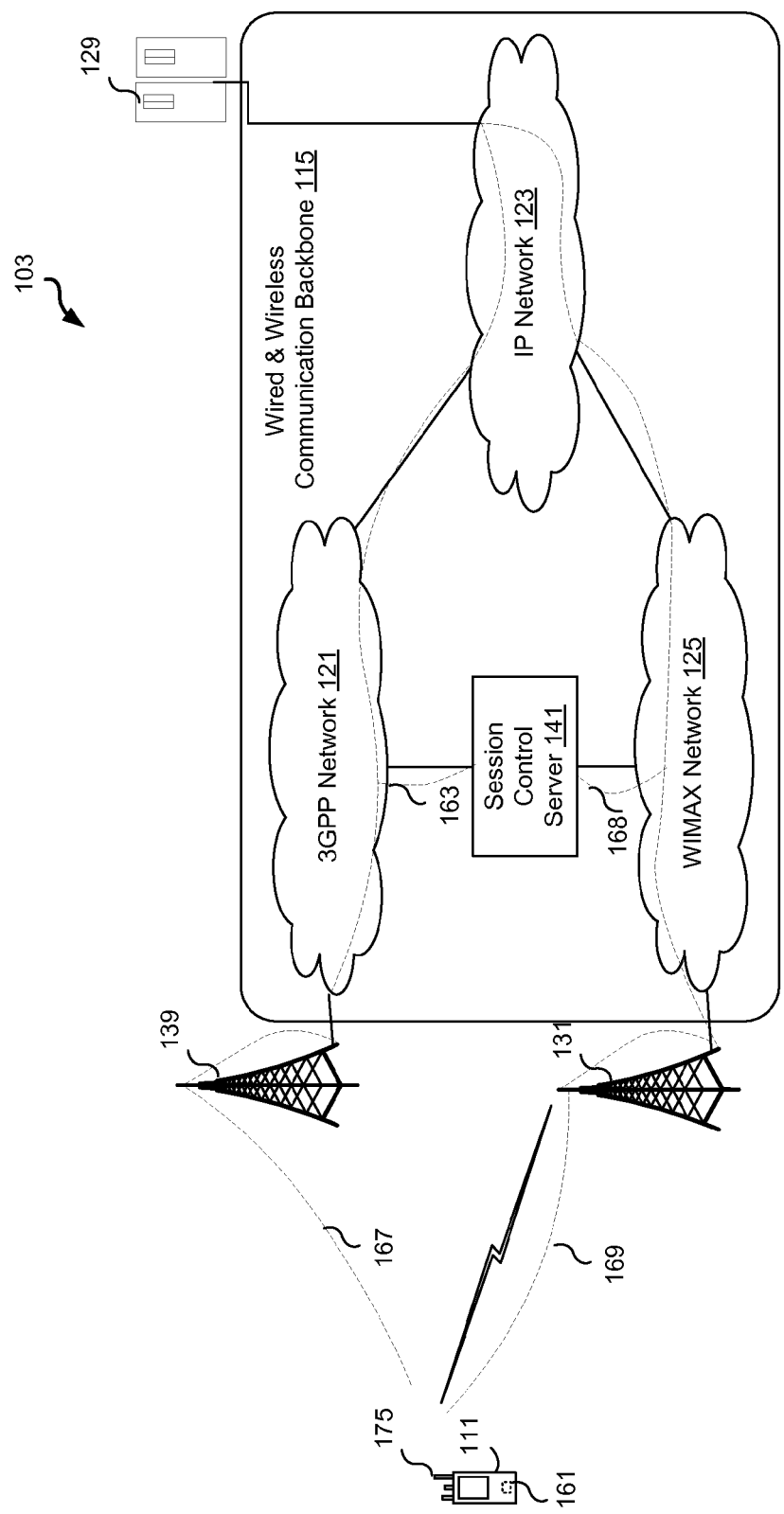
FIG. 2B is a block diagram illustrating two exemplary wireless networks that share a session control server that is operable to support AAA vouchers, in accordance with an embodiment of the invention.

FIG. 2B is a block diagram illustrating two exemplary wireless networks that share a session control server that is operable to support AAA vouchers, in accordance with an embodiment of the invention. Referring to FIG. 2B, there is shown the communication system 103 after a second session or call has been added that traverses the communication path 169 between the multimode wireless device (MWD) 111 and the application server 129 via the WIMAX base station 131, the WIMAX network 125 and the IP network 123. In this regard, the communication path 167 described with respect to FIG. 2A is maintained while the communication path 169 has been added.

In operation, referring to FIG. 2A, the multimode wireless device (MWD) 111 initiates a call or session with the application server 129 by conducting authentication, authorization and/or accounting (AAA) transactions with the SCS 141 that may be similar to the AAA transactions described with respect to FIG. 1A. Accordingly, the 3GPP base station 121 sends a session or call granted message to the MWD 111 and the 3GPP network 121 sets up the data communication path 167 between MWD 111 and the application server 129 via the 3GPP base station 139, the 3GPP network 121 and the IP network 123. In this regard, the application server 129 and the MWD 111 communicate via the communication path 167. During the communication, an entity such as the MWD 111 or the WIMAX base station 131 determines that the MWD 111 will add a second session and/or call to the application server 129 or another server (not shown) in the IP network 123 via WIMAX base station 131 and the WIMAX network 125. In various embodiments of the invention, the MWD 111 foregoes AAA transactions with the WIMAX network 125 because the SCS 141 is operable to vouch for the credibility of the MWD 111 based on the AAA transactions that were conducted via the 3GPP network 121. Accordingly, the 3GPP base station sends an AAA voucher request for enabling a simultaneous WIMAX session and/or call, to the SCS 141 via the 3GPP network 121.

Referring to FIG. 2B, the SCS 141 sends an AAA voucher confirmation to the WIMAX base station 131 via the WIMAX network 125 and the communication path 169 is established for the call and/or session between the MWD 111 and the application server 129. The SCS 141 continues authorization and/or accounting management via the path 163 for the continued communication path 167 between the MWD 111 and the application server 129. In addition, the SCS 141 manages authorization and/or accounting management for resource usage along the path 169 via the path 168 to the WIMAX network 121.

Figure 3:
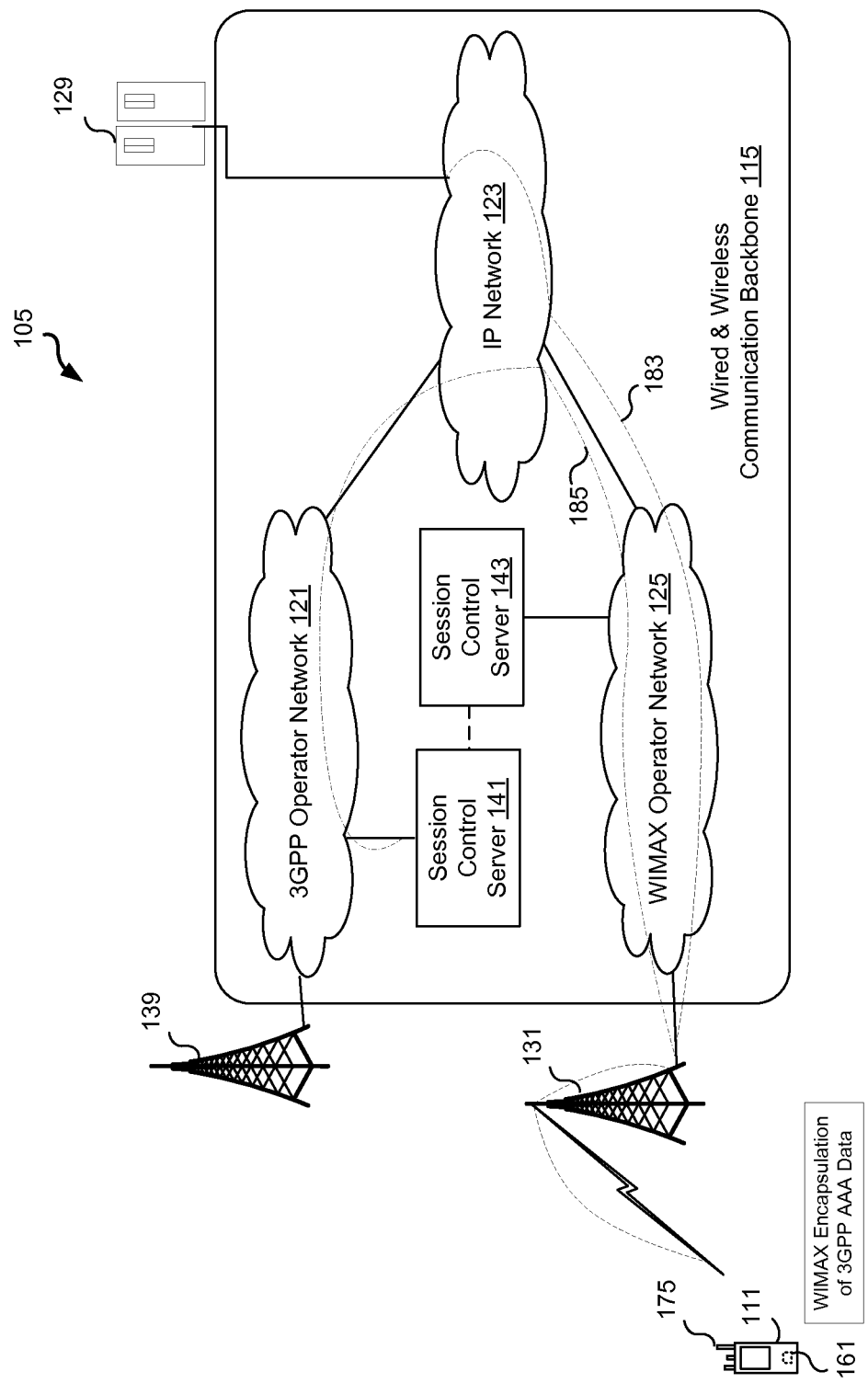
FIG. 3 is a block diagram illustrating an exemplary network extension enabled to utilize authentication, authorization and/or accounting vouchers, in accordance with an embodiment of the invention.

FIG. 3 is a block diagram illustrating an exemplary network extension enabled to utilize authentication, authorization and/or accounting vouchers, in accordance with an embodiment of the invention. Referring to FIG. 3, there is shown a communication system 105 comprising a communication backbone 115, 3GPP network 121, a WIMAX network 125, an IP network 123, a multimode wireless device (MWD) 111, one or more antennas 175, a subscriber identity module (SIM) 161, a 3GPP base station 139, a WIMAX base station 131, session control servers 141 and 143, an application server 129 a communication path 183 and a communication path 185.

The numbered network elements shown in the communication system 105 are similar or substantially the same as the respective numbered elements shown in the communication system 101 of FIGS. 1A and 1B. A difference between the communication system 101 and communication system 105 is that in the communication system 105 shown in FIG. 3 comprises an extension of the 3GPP network 121 to the WIMAX base station 131.

The SCS 141 is operable to handle authentication, authorization and/or accounting (AAA) for the 3GPP network 121. In addition, the SCS 141 is operable to exchange AAA information with the MWD 111 via one or more of the WIMAX base station 131, the WIMAX network 125, the wired and/or wireless backbone 115, the 3GPP network 121 and the SCS 143. The route between the WIMAX base station 131 and the SCS 141 may vary depending on a network configuration.

In operation, the MWD 111 conducts AAA transactions with the SCS 141 in the 3GPP network 121 via a path comprising one or more of the WIMAX base station 131, the WIMAX network 121 and the wired and/or wireless backbone 115 for example. In an instance when an AAA transaction is successful, the SCS 141 and/or the 3GPP network 121 are operable to deliver an AAA voucher to the WIMAX network 125 that enables the MWD 111 to engage in a data session or call via the WIMAX base station 131 and/or the WIMAX network 125. In this regard, the SIM 161 in the MWD 111 comprises information that enables the MWD 111 to access the WIMAX network 125 and/or one or more other networks based on an AAA voucher from the SCS 141 and/or the 3GPP network 121.

In an exemplary embodiment of the invention, the MWD 111 determines that it will attempt to initiate a call and/or session with the application server 129 and download data from the server via the WIMAX base station 131 and the WIMAX network 125. The MWD 111 initiates communication with the WIMAX base station 131 to communicate authentication information to the SCS 141 on the 3GPP network 125. The 3GPP AAA information is encapsulated in a WIMAX wrapper and sent via the path 185 through the WIMAX base station 131, the WIMAX network 125 and the wired and/or wireless backbone 115 to the 3GPP network and/or SCS 141. The SCS 141 authenticates the MWD 111 and sends an AAA voucher to the WIMAX network 125 via the IP network 123 or the SCS 143 for example. The call and/or the session is granted which enables downloading data from the application server 129 to the MWD 111 via the path 183 in the WIMAX network 125. The SCS 141 and/or SCS 143 tracks resource usage during the downloading of data in the WIMAX network 125 for billing purposes.

Figure 4A:
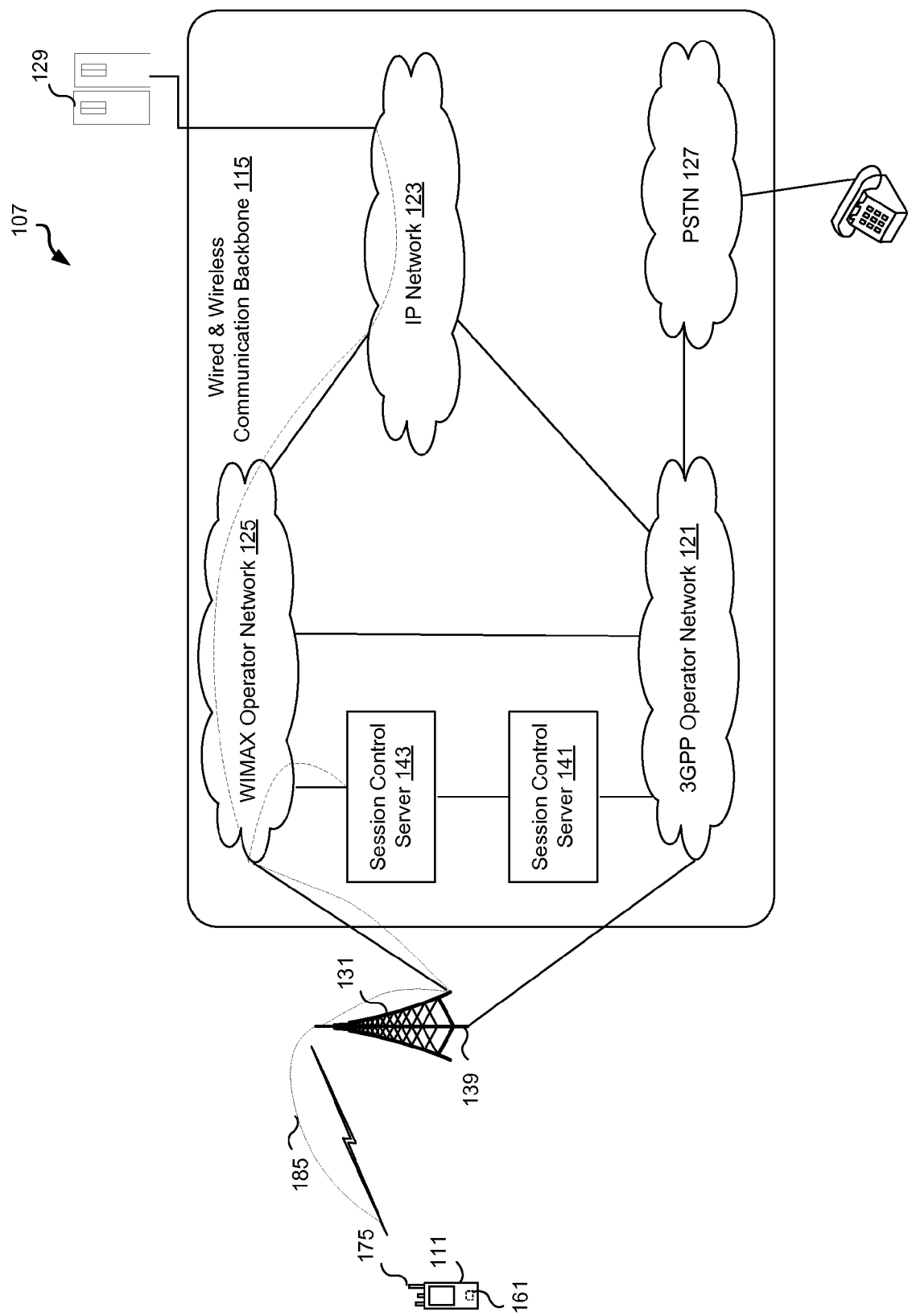
FIG. 4A is a block diagram illustrating exemplary networks operated by different service providers enabled to support simultaneous sessions by a multimode wireless device, in accordance with an embodiment of the invention.

FIG. 4A is a block diagram illustrating exemplary networks operated by different service providers enabled to support simultaneous sessions by a multimode wireless device, in accordance with an embodiment of the invention. Referring to FIG. 4A, there is shown communication system 107 comprising a communication backbone 115, 3GPP network 121, a WIMAX network 125, an IP network 123, a multimode wireless device 111, one or more antennas 175, a subscriber identity module (SIM) 161, a 3GPP base station 139, a WIMAX base station 131, session control servers 141 and 143, an application server 129, a communication path 185, a public switched telephone network (PSTN) 127 and the telephone 113.

The numbered network elements shown in the communication system 107 are similar or substantially the same as the respective numbered elements shown in the communication system 101 shown in FIGS. 1A an1B. However, in FIG. 1A and FIG. 1B, the 3GPP base station 139 and the WIMAX base station 131 are located on different support structures while in FIGS. 4A and 4B, the base stations are co-located, for example, the base stations and their associated antennas share the same support structure. Notwithstanding, in FIG. 4A and FIG. 4B, the 3GPP base station 139 is part of the 3GPP network and the WIMAX base station 131 is part of the WIMAX network 125. In addition, the communication system 107 shown in FIGS. 4A and 4B comprises the PSTN 127 which is coupled to the telephone 113. The 3GPP network 121 is operable to communicate with the PSTN 127 via the wired and/or wireless backbone 115. Moreover, in FIG. 4A, the communication path 185 is operable to handle a call and or session such as video streaming for example, between the WIMAX base station 131 and the application server 129 via the WIMAX network 125.

Figure 4B:
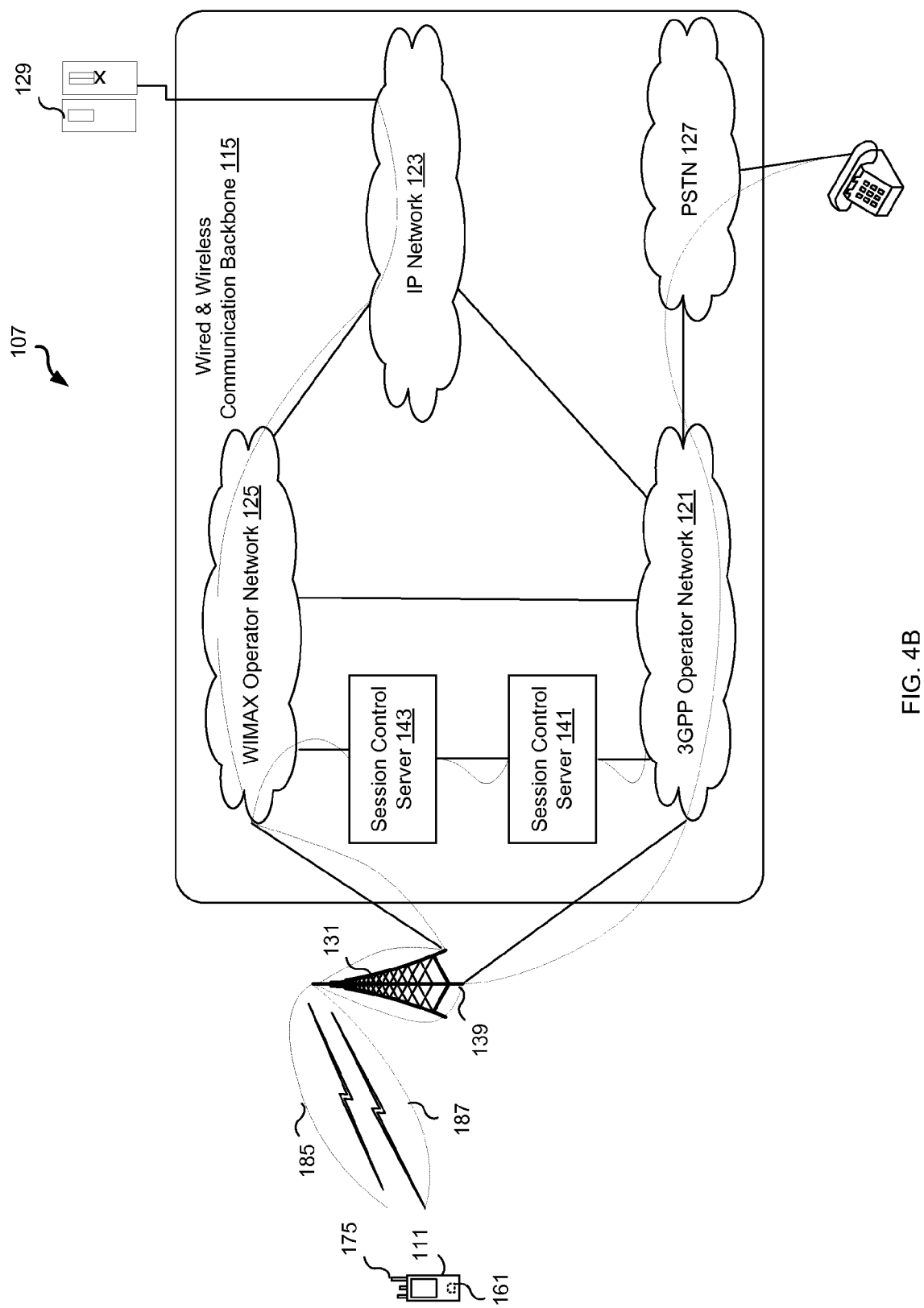
FIG. 4B is a block diagram illustrating exemplary networks operated by different service providers enabled to support simultaneous sessions by a multimode wireless device, in accordance with an embodiment of the invention.

FIG. 4B is a block diagram illustrating exemplary networks operated by different service providers enabled to support simultaneous sessions by a multimode wireless device, in accordance with an embodiment of the invention. Referring to FIG. 4B, there is shown the system 107 that is described with respect to FIG. 4A. In addition, the FIG. 4B comprises a second communication path 187 between the MWD 111 and the telephone 113. The communication path 187 traverses a path comprising the 3GPP base station 139, the 3GPP network 121 and the PSTN 127.

In operation, the multimode wireless device (MWD) 111 initiates a call or session with the application server 129 by conducting authentication, authorization and/or accounting (AAA) transactions with the SCS 143 via the WIMAX base station 131 and WIMAX network 125. The AAA transactions are similar to the AAA transactions between the MWD 111 and the SCS 141 via the 3GPP base station 139 and 3GPP network 121 described with respect to FIG. 1A. In addition, a call and/or session is established between the MWD 111 and application server 129. In this regard, the established call and/or session traverses the communication path 185 from the MWD 111 to the application server 129 via the WIMAX base station 131, the WIMAX network 125 and the IP network 123.

Referring to FIG. 4B, during the call and/or session an entity such as the MWD 111, initiates a second simultaneous call and/or session between the MWD 111 and the telephone 113. In this regard, the MWD 111 sends a second call and/or session request to the 3GPP base station 139. The 3GPP base station 139 sends a second call voucher request to the SCS 143 and/or SCS 141 via the 3GPP network 121. In various embodiments of the invention, the MWD 111 foregoes AAA transactions with the 3GPP base station 139 because the SCS 143 is operable to vouch for the credibility of the MWD 111 based on the prior AAA transactions that were conducted via the WIMAX base station 131. In instances when the voucher is approved, the SCS 143 sends an AAA voucher confirmation to the 3GPP base station 139 via the SCS 141 and/or the 3GPP network 121.

The 3GPP base station 139 sends a second simultaneous call accounting start request to the SCS 143 and/or 141 and receives an accounting start confirmation from the SCS 143 and/or 142. Accordingly a simultaneous second call and/or session is established between the MDW 111 and the telephone 113. The SCS 143 continues authorization and/or accounting management for continued communication between the MWD 111 and the application server 129 and adds authorization and/or accounting management for the call between the MWD 111 and the telephone 113. The communication path 187 handles the call and/or session between the MWD 111 and the telephone 113. In various embodiments of the invention, the SCS 143 handles accounting for the path 185 while the SCS 141 handles accounting for the path 187. In other embodiments of the invention, one of the SCSs 143 or 141 handles accounting for both paths 185 and 187. The invention is not limited with regard to which SCS handles accounting procedures following an authentication voucher procedure for a particular communication path.

In an embodiment of the invention, a mobile wireless communication device 111 communicates information to a first network device, for example, the 3GPP base station 139 and/or the session control server 141 in a first wireless network 121 that utilizes a first wireless communication standard. In this regard, the first network device authenticates, authorize and/or manage accounting for the mobile device 111 for use within the first network 121. When the mobile wireless communication device 111 is located within a service area of a second wireless network 125 that utilizes a second wireless communication standard, a communication session is established with the second network 125 based on the authentication, authorization and/or accounting management for the first network device the 3GPP base station 139 and/or the session control server 141. In this regard, the first network device communicates data related to the authentication, authorization and/or accounting management to a second network device, for example, the WIMAX base station 131 and/or the session control server 143 that is in the second network 125 to enable the communication session with the mobile wireless communication device 111.

In various embodiments of the invention, the mobile communication device is operable to communicate the authentication, authorization and/or accounting information to the first network device in the first wireless network that utilizes the first wireless communication standard via the second wireless network that utilizes the second wireless communication standard. The mobile communication device 111 establishes the communication session with the second network 125 without transferring the authentication, authorization and/or accounting management information to the second network device, for example, the WIMAX base station 131 and/or the session control server 143. Furthermore, the mobile communication device 111 establishes simultaneous communication sessions with the first network 121 and the second network 125 utilizing the data related to the authentication, authorization and/or accounting management.

The first network device, for example, the 3GPP base station 139 and/or the session control server 141 and the second network device, for example, the WIMAX base station 131 and/or the session control server 143 and/or another network device that enables authentication, authorization and/or the accounting management comprise a session control server. The session control server 141 is shared by the first network and the second network. In various embodiments of the invention, the mobile wireless communication device 111 communicates via an extension of the first network 121 wherein the extension comprises a portion of the second network 125. Access via the extension to the first network 121 is based on data communicated from the second network device related to authentication, authorization and/or accounting management for the second network 125. In various embodiments of the invention, the mobile wireless communication device 111 receives stores and/or modifies additional information associated with the authentication, authorization and/or accounting management from the second network device the base station 139.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for multiple network, shared access security architecture supporting simultaneous use of single SIM multi-radio device and/or phone.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method comprising:
at a server system,
receiving an access request from a mobile wireless device over a first wireless communication network that utilizes a first wireless communication standard for wireless communication with wireless devices including the wireless device, including receiving device security credentials from the mobile wireless device;
initiating authentication, authorization or accounting transactions for the mobile wireless device on the first wireless communication network;
based on the received device security credentials from the mobile wireless device, granting access for the mobile wireless device to the first wireless communication network;
based on the authentication, authorization or accounting transactions for the mobile wireless device, communicating a mobile access voucher to a server which controls communication in a second wireless communication network that utilizes a second wireless communication standard for wireless communication with wireless devices including the mobile wireless device, the mobile access voucher configured to cause the server of the second wireless communication network to initiate a wireless communication session between an access point of the second wireless communication network and the mobile wireless device without requiring authentication, authorization or accounting transactions for the mobile wireless device on the second wireless communication network
at the server system, in response to the received access request from the mobile wireless device,
establishing a first communication path over the first wireless communication network between the mobile wireless device and an application server;
communicating data over the first communication path; and
after initiation of the wireless communication session between the access point of the second wireless communication network and the mobile wireless device over a second communication path over the second wireless communication network, maintaining communication of data over the first communication path simultaneously during communication over the second communication path.

2. The method of claim 1 further comprising:
based on the received device security credentials from the mobile wireless device, beginning accounting procedures at the first wireless communication network for the mobile wireless device.

3. The method of claim 2 further comprising:
receiving a request to start accounting for the wireless communication session between the access point of the second wireless communication network and the mobile wireless device from the server which controls communication in the second wireless communication network; and communicating an accounting start confirmation in response to the received request to start accounting to cause initiation of the wireless communication session between the access point of the second wireless communication network and the mobile wireless device.

4. A method comprising:
by a server,
receiving an access request from a mobile wireless device over a first wireless communication network that utilizes a first wireless communication standard for wireless communication with wireless devices including the wireless device, including receiving device security credentials from the mobile wireless device;

initiating authentication, authorization or accounting transactions for the mobile wireless device on the first wireless communication network;

based on the received device security credentials from the mobile wireless device, granting access for the mobile wireless device to the first wireless communication network ; and based on the authentication, authorization or accounting transactions for the mobile wireless device, communicating a mobile access voucher to a server which controls communication in a second wireless communication network that utilizes a second wireless communication standard for wireless communication with wireless devices including the mobile wireless device, the mobile access voucher configured to cause the server of the second wireless communication network to initiate a wireless communication session between an access point of the second wireless communication network and the mobile wireless device without requiring authentication, authorization or accounting transactions for the mobile wireless device on the second wireless communication network;

at the server, in response to the received access request from the mobile wireless device, communicating a subscriber identity module (SIM) challenge to the mobile wireless device;

receiving a SIM challenge response from the mobile wireless device; and if the received SIM challenge response matches an expected response, granting access for the mobile wireless device to the first wireless communication network.

5. A method comprising:
by a server,
receiving an access request from a mobile wireless device over a first wireless communication network that utilizes a first wireless communication standard for wireless communication with wireless devices including the wireless device, including receiving device security credentials from the mobile wireless device;

initiating authentication, authorization or accounting transactions for the mobile wireless device on the first wireless communication network;

based on the received device security credentials from the mobile wireless device, granting access for the mobile wireless device to the first wireless communication network ; and based on the authentication, authorization or accounting transactions for the mobile wireless device, communicating a mobile access voucher to a server which controls communication in a second wireless communication network that utilizes a second wireless communication standard for wireless communication with wireless devices including the mobile wireless device, the mobile access voucher configured to cause the server of the second wireless communication network to initiate a wireless communication session between an access point of the second wireless communication network and the mobile wireless device without requiring authentication, authorization or accounting transactions for the mobile wireless device on the second wireless communication network;

at the server, in response to the received access request from the mobile wireless device,
establishing a first communication path over the first wireless communication network between the mobile wireless device and an application server;
communicating data over the first communication path;
after initiation of the wireless communication session between the access point of the second wireless communication network and the mobile wireless device over a second communication path over the second wireless communication network, handing off communication of data from the first communication path to the second communication path; and
terminating the first communication path.

6. A method comprising:
at a mobile wireless device,
storing identity credentials in a single subscriber identity module;
communicating a request for connection from the mobile wireless device to a first network device of a first wireless network that utilizes a first wireless communication standard, the communication of the request for connection in accordance with the first wireless communication standard;
receiving a security challenge from the first wireless network;
determining a response to the security challenge using the stored identity credentials;
communicating the response to the first network device, the first network device operative use the response to authenticate, authorize or manage accounting for the mobile wireless device for communication by the mobile wireless device with the first wireless network, the first network device configured to grant access by the mobile wireless device to one or more other wireless networks in addition to the first wireless network based on a successful authentication, authorization, or accounting management transaction, the first network device further configured to communicate to the one or more other wireless networks a security voucher for the mobile wireless device to access the one or more other wireless networks;

receiving from the first network device a grant of access to a second wireless network of the one or more other wireless networks, the second wireless network configured to use a different wireless communication standard for wireless communication with devices in a service area of the second wireless network including the mobile wireless device; and when within the service area of the second wireless network, establishing a wireless communication session with the second wireless network according to the second wireless communication standard while foregoing communication of authorization information to the second network, the communication of authorization information being otherwise required in the absence of the security voucher communicated by the first network device.

7. The method of claim 6 wherein communicating a request for connection from the mobile wireless device to a first network device and establishing a wireless communication session with the second wireless network comprise communicating by the mobile wireless device with a common session control server for both the first wireless network and the second wireless network.

8. The method of claim 6 wherein communicating a request for connection from the mobile wireless device to a first network device comprises establishing an authorization path between the mobile wireless device and a session control server which controls authentication, authorization, or accounting management transactions for the first wireless network, at least a portion of the authorization path including the first wireless network, and further comprising establishing a communication path for communication of data with a remote application server, at least a portion of the communication path including the first wireless network.

9. The method of claim 8 further comprising:
communicating resource usage information about communication resource usage by the mobile wireless device to the session control server on the authorization path between the mobile wireless device and the session control server.

10. The method of claim 8 further comprising:
establishing a second communication path for communication of data with the remote application server, least a portion of the second communication path including the second wireless network;
communicating with the remote application server using the second communication path; and
communicating resource usage information about communication resource usage on the second communication path by the mobile wireless device to the session control server on the authorization path between the mobile wireless device and the session control server.

11. The method of claim 10 further comprising:
communicating with a remote application server using a first communication path, at least a portion of the first communication path including the first wireless network; and
simultaneously, communicating with a remote application server using a second communication path, at least a portion of the second communication path including the second wireless network.

12. The method of claim 6 further comprising:
communicating with a remote application server using a first communication path, at least a portion of the first communication path including the first wireless network; and handing off communication from the first communication path to a second communication path which includes the second wireless network.

13. The method of claim 6 further comprising:
at the mobile wireless device, determining initiate the wireless communication session with the second wireless network; and
communicating to the first network device a request for communication of a security voucher to the second wireless network to authorize establishment of the wireless communication session with the second wireless network while foregoing communication of authorization information to the second network.

14. The method of claim 13 further comprising:
communicating a data session request from the mobile wireless device to an access point of the second wireless network; and
receiving data from the access point of the second wireless network without providing additional security credentials for authorization.

15. A method comprising:
at a mobile wireless communication device,
storing identity credentials for the mobile wireless communication device in a single subscriber identity module (SIM);
communicating with a first network device in a first wireless network that utilizes a first wireless communication standard, including:
communicating a connection request to the first network device;
receiving from the first network device a SIM challenge;
retrieving the stored identity credentials from the single SIM;
processing the SIM challenge using the retrieved identity credentials to produce a SIM challenge response;
communicating the SIM challenge response to the first network device;
receiving from the first network device an indication of a successful SIM challenge response including an access grant for the first wireless network for subsequent communication on the first wireless network;
receiving from the first network device authorization for access to a second wireless network that utilizes a second wireless communication standard;
communicating to the first network device a request for a voucher to access the second wireless network based on the access grant for the first wireless network;
subsequently, communicating with a second network device in the second wireless network that utilizes the second wireless communication standard, including
foregoing authorization transactions with the second network device, the authorization transactions being otherwise required to initiate communication with the second wireless network in the absence of the received authorization for access to the second wireless network from the first network device;
initiating a data session with the second network device; and
receiving a session granted message from the second network device based on receipt of the voucher to access the second wireless network by the second network device.

16. The method of claim 15 wherein the communication of the SIM challenge response to the first network device is operative to cause the first network device to communicate to one or more other wireless networks a security voucher for the mobile wireless communication device to access the one or more other wireless networks.

17. The method of claim 15 further comprising:
while communicating with the second network device over a second communication path including the second wireless network from the mobile wireless communication device to the second network device, simultaneously maintaining a first communication path between the mobile wireless communication device and the first network device over the first wireless network.

18. The method of claim 17 further comprising:
releasing portions of the first communication path when the portions of the first communication path are no longer required.

19. The method of claim 15 further comprising:
communicating with a remote server over a first communication path including a portion of the first wireless network from the mobile wireless communication device, and simultaneously communicating with the remote server over a second communication path including a portion of the second wireless network from the mobile wireless communication device, and simultaneously communicating resource usage information about communication resource usage on the first communication path and the second communication path by the mobile wireless device to the first network device on an authorization path between the mobile wireless device and the first network device.

* * * * *